United States Patent
Maddox et al.

(10) Patent No.: US 6,437,060 B1
(45) Date of Patent: Aug. 20, 2002

(54) PROCESS FOR THE POLYMERISATION OF OLEFINS IN THE GAS PHASE

(75) Inventors: Peter James Maddox, Staines; Peter Sefton Williams, Teddington, both of (GB)

(73) Assignee: BP Chemicals Limited, London (GB)

(*) Notice: Subject to any disclaimer, the term of this patent is extended or adjusted under 35 U.S.C. 154(b) by 0 days.

(21) Appl. No.: 09/471,259

(22) Filed: Dec. 23, 1999

Related U.S. Application Data

(63) Continuation of application No. PCT/GB97/01730, filed on Jun. 27, 1997.

(51) Int. Cl.$^7$ .............................. C08F 2/34; C08F 4/642; C08F 4/643
(52) U.S. Cl. ........................... 526/73; 526/75; 526/126; 526/127; 526/129; 526/130; 526/134; 526/160; 526/161; 526/172; 526/901; 526/904
(58) Field of Search .......................... 526/75, 130, 134, 526/172, 901, 904, 73, 126, 127, 129, 160, 161

(56) References Cited

FOREIGN PATENT DOCUMENTS

| EP | 0 279 863 | 8/1988 |
|---|---|---|
| EP | 0 447 071 | 9/1991 |
| EP | 0 452 920 | 10/1991 |
| EP | 0 589 638 | 3/1994 |
| EP | 589638 A2 * | 3/1994 |
| EP | 673950 A1 * | 9/1995 |
| EP | 0 673 950 | 9/1995 |
| EP | 0 763 546 | 3/1997 |
| EP | 0 816 394 | 1/1998 |
| WO | WO 94/07927 | 4/1994 |

* cited by examiner

Primary Examiner—David W. Wu
Assistant Examiner—R. Rabago
(74) Attorney, Agent, or Firm—Finnegan, Henderson, Farabow, Garrett and Dunner, L.L.P.

(57) ABSTRACT

A process for the polymerisation of olefins in the gas phase is carried out in the presence of a supported transition metal catalyst. The process involves a prepolymerisation step which may be performed in-situ and in particular the prepolymer may be prepared in the dry phase. The catalyst may for example comprise a constrained geometry transition metal complex supported on silica and used in the presence of an activator. The prepolymerisation step enables the activity of the catalyst to be improved.

15 Claims, No Drawings

PROCESS FOR THE POLYMERISATION OF OLEFINS IN THE GAS PHASE

This application is a continuation of International Application No. PCT/GB97/01730, filed Jun. 27, 1997, the content of which is incorporated herein by reference.

BACKGROUND OF THE INVENTION

The present invention relates to a process for the polymerisation of olefins and in particular to a process for the homopolymerisation of ethylene or copolymerisation of ethylene and alpha-olefins in the gas phase by use of a prepolymerised transition metal complex catalyst.

Traditional olefin polymerisation catalysts have been based on transition metal salts of Group IV to VIII metals in combination with base metal alkyls of Group I to III metals. Such catalysts known as Ziegler-Natta catalysts have been used to polymerise olefins in solution, slurry and gas phase processes. Another catalyst system used for polymerisation of olefins is based on chromium oxide and is often referred to as Phillips-type catalyst system.

A problem encountered when such catalyst systems have been used in the gas phase has been the control of the morphology of the polymer produced. The morphology of polymers produced in the gas phase has been improved by use of prepolymerisation processes in which typically in a first stage the contact between one or more olefins with the Ziegler-Natta catalyst results in the formation of a prepolymer in the form of solid particles. In a second stage the prepolymer is contacted with one or more olefins under polymerisation conditions in the gas phase to produce polymers directly in the form of powders. In this way the morphology of the final polymer may be improved. A typical prepolymerisation process is described in EP 99774.

Catalysts based on cyclopentadienyl metal complexes have also been widely used for the polymerisation of olefins. These complexes may be used in catalyst systems which comprise a bis(cyclopentadienyl) transition metal complex and a cocatalyst. Such bis (Cp) transition metal complexes have been referred to as metallocenes and are typically based on titanium or zirconium metals and may be cocatalysed with aluminum compounds such as aluminoxanes. When used in gas phase processes such bis (Cp) metallocene systems may be supported on silica.

More recently another type of transition metal complex has been used to prepare olefin polymers. Such complexes have a single cyclopentadienyl ring ligand and a hetero atom bonded to the metal atom and may also be used in conjunction with aluminoxanes. Such 'constrained geometry' catalysts are described in EP 420436 and EP 416815.

Similar catalyst systems are taught in EP 418044 and WO 92/00333. In these systems the catalyst is prepared as the product of a mono(cyclopentadienyl) heteroatom metal complex and an ionic activator compound and such systems have been referred to as ionic mono(cyclopentadienyl) catalysts. Typical ionic activators for such systems may be exemplified by borates.

The complexes described above may be optionally prepolymerised. For example WO 93/23439 describes supported bis (Cp) metallocene catalyst systems, activated with alumoxanes which may be optionally prepolymerised in order to impart improved catalyst particle strength. In this reference the prepolymerisation is performed in the slurry phase at a temperature in the range −15° C. to 30° C. preferably at less than 25° C.

Further examples of the use of prepolymerisation with such bis (Cp) metallocene complexes may be found in EP 452920, EP 516458, EP 582480 and EP 605952.

WO 94/03506 describes supported ionic catalysts based on mono (cyclopentadienyl) complexes and ionic activators which may also be optionally prepolymerised in order to achieve improved particle strength and size and reduced reactor fouling during polymerisation.

WO 94/28034 describes supported bridged bis (Cp) metallocene catalysts in which prepolymerisation reduces the reactor fouling tendencies of the catalyst and enhances the particle morphology control of the final polymer formed.

WO 96/00243 describes chiral metallocenes for the production of highly isotactic polypropylene copolymners in which prepolymerisation is found to improve particle morphology.

In all these systems the valency of the transition metal in the metallocene complex is in either the +3 or more usually in the highest oxidation state of +4.

WO 95/00526 describes titanium or zirconium complexes in which the transition metal is in the +2 formal oxidation state. The complex also comprises a neutral, conjugated or non-conjugated diene ligand which forms a π-complex with the metal. Such complexes are rendered catalysts by combination with an activating cocatalyst for example aluminoxanes, boranes or borates. When used in a gas phase process these catalysts are suitably supported on silica. However there is no mention of prepolymerisation as an option when using such catalyst systems in the gas phase.

Accordingly in the above complexes when prepolymerisation has been suggested it is in order to either reduce reactor fouling or to improve the morphology of the final polymer both advantages typically claimed with the earlier Ziegler-Natta or chromium systems.

SUMMARY OF THE INVENTION

We have now found that prepolymerisation in the presence of transition metal complexes may be used to improve reactivity in particular when performed in the gas phase, for example in an agitated dry phase reactor.

In particular we have now found that the catalytic activity of certain transition metal complex catalysts in the gas phase may be improved by use of an initial prepolymerisation step performed at low temperature (with respect to the final polymerisation temperature) either in a separate stage or in-situ prior to the final polymerisation stage.

Thus according to the present invention there is provided a process for polymerising ethylene or copolymerising ethylene and one or more alpha-olefins in the gas phase comprising:

(1) in a first stage prepolymerising ethylene or ethylene and one or more alpha-olefins in the gas phase at a temperature in the range 20 to 70° C. in the presence of a catalyst system comprising (a) a supported transition metal complex and (b) an activator, (2) optionally, recovering the prepolymerised catalyst, and (3) in a second stage polymerising ethylene or ethylene and one or more alpha-olefins in the gas phase at a temperature in the range 65 to 100° C. in the presence of said prepolymerised catalyst.

DETAILED DESCRIPTION OF THE INVENTION

The present invention is particularly suitable for use with 'constrained geometry complexes'.

The term 'constrained geometry complex' will be readily understood by one skilled in the art to mean complexes in which the metal atom is forced into greater exposure of the active metal site because of one or more substituents on the delocalised π bonded moiety. Such complexes are described in detail in EP 416815 incorporated herein by reference.

The process of the present invention may be performed in a single gas phase reactor in which both stages are performed or the prepolymerised catalyst from the first stage may be recovered before use in the final polymerisation.

The prepolymerised catalyst may be recovered by conventional means.

The prepolymerisation stage is most preferably carried out at a temperature in the range 20 to 65° C. most preferably in the range 25–40° C. and the final polymerisation stage at a preferred temperature in the range just above 65° C. to 100° C., most preferably in the range 70 to 85° C.

During the prepolymerisation stage the pressure is typically in the range 0.1 to 10 bar. In the final polymerisation stage the pressure is increased and is typically in the range 5 to 20 bar.

Titanium (II) or zirconium (II) complexes are particularly suitable for use as the constrained geometry complex in the process of the present invention. Such complexes are disclosed in the aforementioned WO 95/00526 which is incorporated herein by reference. The complexes have the general formula:

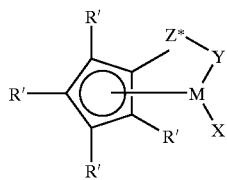

wherein
  R' each occurrence is independently selected from hydrogen, hydrocarbyl, silyl, germyl, halo, cyano, and combinations thereof, said R' having up to 20 non hydrogen atoms, and optionally, two R' groups (where R' is not hydrogen, halo or cyano) together form a divalent derivative thereof connected to adjacent positions of the cyclopentadienyl ring to form a fused ring structure;
  X is a neutral $\eta^4$- bonded diene group having up to 30 non-hydrogen atoms, which forms a π-complex with M;
  Y is —O—, —S—, —NR*—, —PR*—;
  M is titanium or zirconium in the +2 formal oxidation state;
  Z* is $SiR_2$, $CR^*_2$, $SiR^*_2SiR^*_2$, $CR^*_2CR^*_2$, $CR^*{=}CR^*$, $CR_2SiR^*_2$, or $GeR^*_2$; wherein
  R* each occurrence is independently hydrogen, or a member selected from hydrocarbyl, silyl, halogenated alkyl, halogenated aryl, and combinations thereof, said R* having up to 10 non-hydrogen atoms, and optionally, two R* group atom Z* (when R* is not hydrogen), or an R* group from Z* and an R* group from Y form a ring system.

Most preferred complexes are amidosilane or amidoalkanediyl complexes wherein the metal is titanium.

Highly preferred diene groups are 1,4-diphenyl-1,3-butadiene, 1,3-pentadiene, 1,4-dibenzyl- 1,3-butadiene 3-methyl-1,3-pentadiene.

Illustrative but not limiting examples of complexes preferred are (tert-butylamido) (tetramethyl-η5-cyclopentadienyl) dimethylsilane titanium (II) 1,4-diphenyl-1,3-butadiene, (tert-butylamido) (tetramethyl-η5-cyclopentadienyl) dimethyl silane titanium (II) 1,3-pentadiene, (tert-butylamido) (2-methylindenyl) dimethylsilanetitanium (II) 1,4-diphenyl- 1,3-butadiene.

The complexes may be rendered catalytically active by combination with an activating cocatalyst or by use of an activating technique. Suitable activating cocatalysts for use herein include polymeric or oligomeric alumoxanes, especially methylalumoxane, triisobutyl aluminum modified methylalumoxane, or diusobutylalumoxane, strong Lewis acids, such as, $C_{1-30}$ hydrocarbyl substituted Group 13 compounds, especially tri(hydrocarbyl)aluminum- or tri (hydrocarbyl)boron compounds and halogenated derivatives thereof, having from 1 to 10 carbons in each hydrocarbyl or haloogenated hydrocarbyl group, more especially perfluorinated tri(aryl)boron compounds, and most especially tris (pentafluorophenyl)borane; nonpolymeric, inert, compatible, noncoordinating, ion forming compounds (including the use of such compounds under oxidising conditions); bulk electrolysis and combinations of the foregoing activating cocatalysts and techniques. The foregoing activating cocatalysts and activating techniques have been previously taught with respect to such metal complexes in the aforementioned WO 95/00526.

A particularly preferred activator is tris (pentafluorophenyl) boron.

Suitable ion forming compounds useful as cocatalysts comprise a cation which is a Bronsted acid capable of donating a proton, and an inert, compatible, noncoordinating, anion, A-. Preferred anions are those containing a single coordination complex comprising a charge-bearing metal or metalloid core which anion is capable of balancing the charge of the active catalyst species (the metal cation) which is formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are available commercially particularly such compounds containing a single boron atom in the anion portion.

Preferred boron compounds are salts such as:
  tetrakis (pentafluorophenyl) borate
  triethylammonium tetrakis (pentafluorophenyl) borate
  N,N-dimethylanilinium tetrakis (pentafluorophenyl) borate
  N,N-diethylaniliniun tetrakis (pentaflorophenyl) borate.

Other constrained geometry complexes suitable for use in the process of the present invention are those in which the metal is in a higher valency state. Such complexes are disclosed in EP 416815 and WO 91/04257 both of which are incorporated herein by reference. The complexes have the general formula:

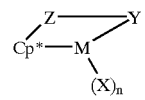

wherein:
  Cp* is a single η5-cyclopentadienyl or η5-substituted cyclopentadienyl group optionally covalently bonded to M through —Z—Y— and corresponding to the formula:

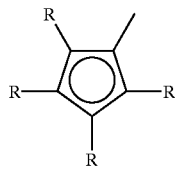

wherein R each occurrence is hydrogen or a moiety selected from halogen, alkyl, aryl, haloalkyl, alkoxy, aryloxy, silyl groups, and combinations thereof of up to 20 non-hydrogen atoms, or two or more R groups together form a fused ring system;

M is zirconium, titanium or hafnium bound in an η5 bonding mode to the cyclopentadienyl or substituted cyclopentadienyl group and is in a valency state of +3 or +4.

X each occurrence is hydride or a moiety selected from halo, alkyl, aryl, silyl, germyl, aryloxy, alkoxy, amide, siloxy, and combinations thereof (e.g. haloalkyl, haloaryl, halosilyl, alkaryl, aralkyl, silylalkyl, aryloxyaryl, and alkyoxyalkyl, amidoalkyl, amidoaryl) having up to 20 non-hydrogen atoms, and neutral Lewis base ligands having up to 20 non-hydrogen atoms;

n is 1 or 2 depending on the valence of M;

Z is a divalent moiety comprising oxygen, boron, or a member of Group 14 of the Periodic Table of the Elements;

Y is a linking group covalently bonded to the metal comprising nitrogen, phosphorus, oxygen or sulfur, or optionally Z and Y together form a fused ring system.

Most preferred complexes are those wherein Y is a nitrogen or phosphorus containing group corresponding to the formula (—NR$^1$) or (—PR$^1$) wherein R$^1$ is C$_1$–C$_{10}$ alkyl or C$_6$–C$_{10}$ aryl and wherein Z is SiR"$_2$, CR"$_2$, SiR"$_2$SiR"$_2$, CR"=CR" or GeR"$_2$ which R" is hydrogen or hydrocarbyl.

Most preferred complexes are those wherein M is titanium or zirconium.

Illustrative, but not limiting examples of suitable complexes are (tert-butylamido) (tetramethyl-η5-cyclopentadienyl) dimethyl silane titanium dimethyl, (tert-butylamido) dibenzyl (tetiamethyl-η5-cyclopendienyl) silane zirconium dibenzyl, (benzylamido) dimethyl (tetramethyl-η5-cyclopentadienyl) silane titanium dichloride, (phenylphosphido) dimethyl (tetramethyl-η5-cyclopentadienyl) silane zirconium dibenzyl and the like.

These complexes are also rendered catalytically active by combination with similar activating cocatalysts as described above. Suitable cocatalysts include aluminoxanes, especially methylaluminoxane (MAO) or strong Lewis acids eg tri (hydrocarbyl) boron compounds or halogenated derivatives.

Particularly suitable as an activator is tris (pentafluorophenyl) boron.

These complexes may also be rendered active by combination with ion forming compounds as described above.

The transition metal complex suitable for use in the process of the present invention may also be a traditional bis (cyclopentadienyl) transition metal complex as disclosed in EP 129368 or EP 206794. Such complexes may be represented by the formula Cp$_2$MX$_2$ wherein M is Zr, Ti or Hf and X represents an anionic ligand. Such complexes may advantageously comprise cyclopentadienyl rings which are substituted by hydrocarbyl groups for example alkyl. Examples of such complexes are bis (cyclopentadienyl) zirconium dichloride or bis (tetramethylcyclopentadienyl) zirconium dichloride.

Also suitable are transition metal complexes wherein the substituents on the cyclopentadienyl rings form a bridge between the two rings for example complexes disclosed in EP 659773. A particularly suitable complex is ethylene bis (indenyl) zirconium dichloride.

The above bis (cyclopentadieinyl) transition metal complexes are most suitably activated by alumoxanes in particular methyl alumoxane.

Another type of transition metal complex suitable for use in the process of the present invention are bis (cyclopentadienyl) diene complexes as disclosed in WO 96/04920, incorporated herein by reference.

Such complexes may be represented by the formula:

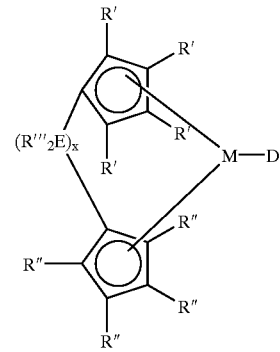

wherein:

M is titanium, zirconium or hafnium in the +2 or +4 formal oxidation state:

R' and R" in each occurrence are independently selected from the group consisting of hydrogen, hydrocarbyl, silyl, germyl, cyano, halo and combinations thereof, said R' and R" having up to 20 non-hydrogen atoms each, or adjacent R' groups and/or adjacent R" groups (when R' and R" are not hydrogen atoms each, or adjacent R' groups and/or adjacent R" groups (when R' and R" are not hydrogen, halo or cyano) together form a divalent derivative thereby forming a fused ring system;

E is silicon, germanium or carbon;

x is an integer from 1 to 8;

R'" independently each occurrence is hydrogen or a group selected from silyl, hydrocarbyl, hydrocarbyloxy and combinations thereof, or two R'" groups together form a ring system, said R'" having up to 30 carbon or silicon atoms, and D is a stable, conjugated diene, optionally substituted with one or more hydrocarbyl groups, silyl groups, hydrocarbylsilyl groups, silylhydrocarbyl groups, or mixtures thereof, said D having from 4 to 40 nonhydrogen atoms.

Particularly suitable are complexes in which M is zirconium and E is carbon.

Such complexes may suitably be activated by the cocatalysts described above. A particularly preferred cocatalyst is tri (pentafluorophenyl) boron.

The molar ratio of complex to activator employed in the process of the present invention may be in the range 1:10000 to 100:1. A preferred range is from 1:5000 to 10:1 and is most preferred in the range 1:10 to 1:1.

The complexes according to the process of the present invention for use in the gas phase are supported.

Typically the support can be any organic or inorganic inert solid. particularly porous supports such as talc, inorganic oxides and resinous support materials such as polyolefins. Suitable inorganic oxide materials which may be used include Group 2, 13, 14 or 15 metal oxides such as silica, alumina, silica-alumina and mixtures thereof. Other inorganic oxides that may be employed either alone or in combination with the silica, alumina or silica-alumina are magnesia, titania or zirconia. Other suitable support materials may be employed such as finely divided polyolefins such as polyethylene.

The most preferred support material for use with the supported catalysts according to the process of the present invention is silica. Suitable silicas include Crosfield ES70 and Davidson 948 silicas.

It is preferable that the silica is dried before use and this is typically carried out by heating at elevated temperatures for example between 200 and 850 deg. C.

In a preferred protocol the supported catalyst may be prepared by addition of a solution of the activator in a suitable solvent to a slurry of activated silica treated with a trialkylaluminium compound followed by addition of a solution of the transition metal complex in the same solvent. Alternatively the complex may be added to the trialkylaluminium treated silica before addition of the activator.

A suitable solvent for the preparation of the supported catalyst is toluene.

Suitable trialkylaluminiuin compounds are trimethylaluminium (TMA), triethlyaluminium (TEA) or triisobutylaluminium (TIBAL).

Both the first stage and the second stage may be performed in an agitated dry phase reactor or in a fluidised bed reaction.

Alternatively the prepolymerised catalyst when recovered from the first stage may be used in the second stage in a different gas phase reactor.

The most preferred gas phase reactor for the first stage of the present invention is a dry phase reactor in particularly an agitated dry phase reactor (ADPR).

When a fluidised bed reactor is used a most preferred process is that described in WO 94/28032. Other fluidised bed processes are described in EP 89691, WO 94/25495 and WO 94/25497.

The present invention also provides for a method for preparing a prepolymerised catalyst.

Thus according to another aspect of the invention there is provided a process for preparing a prepolymerised catalyst comprising prepolymerising ethylene or ethylene and are or more alpha olefins in the presence of a catalyst system comprising (a) a supported transition initial complex and (b) an activator, to form a prepolymerised catalyst and then recovering said prepolymerised catalyst.

The present invention may also be applicable to processes wherein the prepolymerisation is carried out in the slurry phase.

Thus according to another aspect of the present invention there is provided a process for polymerising ethylene or ethylene and one or more alpha-olefins comprising:
(1) in a first stage, prepolymerising ethylene or ethylene and one or more alpha-olefins at a temperature in the range from −20° C. to +60° C. in the presence of a catalyst system comprising (a) a supported transition metal complex and (b) an activator, to form a prepolymerised catalyst,
(2) optionally, recovering the prepolymerised catalyst,
(3) in a second stage, polymerising ethylene or ethylene and one or more alpha-olefins in the gas phase at a temperature in the range from 65° C. to 100° C. in the presence of the prepolymerised catalyst.

The prepolymerised catalyst may be recovered before the second stage or used in-situ.

The process according to the present invention is suitable for use in the polymerisation of olefins in particularly in the homopolymerisation of ethylene or the copolymerisation of ethylene with other alpha-olefins in particular those having from 3 to 10 carbon atoms. Most preferred alpha-olefins are 1-butene, 1-hexene and 4-methyl-1-pentene.

Using the process according to the present invention polymers may be prepared having densities in the range from 0.905 to 0.960 g/cc and a melt index in the range 0.1 to 20 according to ASTM D1238 condition E (2.16 kg. at 190 deg. C.).

The process of the present invention will now be further illustrated by reference to the following examples. The examples clearly show that by use of the prepolymerisation stage either separately or in-situ results in an improvement in the activity of the catalyst systems.

EXAMPLES

Example 1

Preparation of Catalyst A 10 g of Crosfield ES70 silica (activated at 500° C.) were slurried in 50 ml dry hexane. 30 ml of 0.5M TMA in hexane were added (1.5 mmol Al/g silica), and the slurry agitated for 2 hours. The treated silica was filtered and washed three times with 20 ml of hexane, then dried in vacuo to a fine powder.

2 g of the TMA treated ES70 silica were slurried in 10 ml of dry toluene. 1.95 ml of a 7.85 wt % solution of tris (pentafluorophenyl)boron in toluene were added, and the mixture shaken vigorously. Then 0.62 ml of a 12.25 wt % solution of (tert-butylamido) (tetramethyl-$\eta^5$-cyclopentadienyl) dimethylsilanetitanium dimethyl in toluene were added. The mixture was shaken well, and then the solvent removed in vacuo at 20° C. to give an yellow powder.

Example 2

Preparation of Catalyst B 7.0 kg of Crosfield ES70 silica (activated at 500° C.) were slurried in 100 liters of hexane. 9.32 liters of 0.976M TEA in hexane were added (1.3 mmol Al/g silica), and the slurry agitated for 2 hours at 30° C. The silica was allowed to settle, and the supernatant hexane removed. The silica was further washed with hexane, until the concentration of Al in the washing had reached <1 mmol Al/liter. Then the silica was dried in vacuo at 40° C.

3 g of the TEA treated ES70 silica were slurried in 15 ml of dry toluene. 1.8 ml of a 7.85 wt % solution of tris (pentafluorophenyl)boron in toluene were added, and the mixture shaken vigorously. Then 0.62 ml of a 10.7 wt % solution of (tert-butylamido) (tetramethyl-$\eta^5$-cyclopentadienyl) dimethylsilanetitanium penta-1,3-diene in toluene were added. The mixture was shaken well, and then the solvent removed in vacuo at 20° C. to give an olive green powder.

Example 3

Preparation of Catalyst C 50 g of the TEA treated ES70 silica, described for the preparation of Catalyst B, were slurried in 150 ml of dry toluene. 10.4ml of a 10.7 wt % solution of (tert-butylamido)(tetramethyl-$\eta^5$-cyclopentadienyl)dimethylsilanetitanium penta-1,3-diene in toluene were added, and the mixture shaken vigorously. Then 29.4 ml of a 7.85 wt % solution of tris(pentafluoropihenlyl)boron in toluene were added. The mixture was shaken well, and then the solvent removed in vacuo at 40° C. to give an olive green powder.

Example 4

Preparation of Catalyst D 10 g of the TEA treated ES70 silica, described for the preparation of Catalyst B, were slurried in 50 ml of dry toluene. 2.1 ml of a 10.7 wt % solution of (tert-butylamido)(tetramethyl-$\eta^5$-cyclopentadienyl)dimethylsilanetitanium penta-1,3-diene in toluene were added, and the mixture shaken vigorously. Then 5.9 ml of a 7.85 wt % solution of tris(pentafluorophenyl)boron in toluene were added. The mixture was shaken well, and then the solvent removed in vacuo at 20° C. to give an olive green powder.

Example 5

Preparation of Catalyst E 45.76 g of the TEA treated ES70 silica, described for the preparation of Catalyst B, were slurried in 225 ml of dry toluene. 9.51 ml of a 10.7 wt % solution of (tert-butylamido)(tetramethyl-$\eta^5$-cyclopentadienyl)dimethylsilanetitanium penta-1,3-diene in toluene were added, and the mixture shaken well. Then 26.9 ml of a 7.85 wt % solution of tris(plentafluorophenyl)boron in toluene were added. The mixture was shaken well, and then the solvent removed in vacuo at 20° C. to give an olive green powder.

Example 6

Preparation of Prepolymer of Catalyst C

A 2.5 liter volume agitated dry phase reactor was baked out at 85° C. under a $N_2$ purge. It was cooled to 25° C. and 44.41 g of catalyst. Catalyst C was added to the reactor. It was pressurized to 0.47 bar with $N_2$. The catalyst was agitated at 300 rpm. 0.30bar of $C_2H_4$ added, but this was quickly reduced to 0.08 bar to maintain the temperature of the reactor below 40° C. This was continued for 126 minutes. 34.0 g of polymer-coated catalyst was recovered under $N_2$ from the reactor. The polymer yield was 0.5 g PE/g catalyst.

Example 7

Preparation of Prepolymer of Catalyst E

A 2.5 liter volume agitated dry phase reactor was baked out at 85° C. under a $N_2$ purge. It was cooled to 25° C., and 46.3 g of catalyst. Catalyst E was added to the reactor. The reactor was pressurized to 1.05 bar with N2. The catalyst was agitated at 325 rpm. $C_2H_4$ was added to the reactor to give a total pressure of 1.25 bar. These conditions were maintained for 3.75 hours. Then the reactor was purged with $N_2$, sealed under 1 bar $N_2$ and left overnight for 16 hours.

$C_2H_4$ was again added to the reactor to give a total pressure of 1.25 bar. 50 minutes after start-up, the pressure was increased to 1.30 bar, and 5 hours after start-up, increased further to 1.42 bar. After 6 hours of polymerisation, the reactor was purged with $N_2$ and 68.1 g of polymer-coated catalyst was recovered under $N_2$. The polymer yield was 2.0 g PE/g catalyst.

Example 8

In-situ Prepolymerisation of Catalyst A 285 g of NaCl was added to a 2.5 liter volume agitated dry phase reactor, which had been previously baked out at 85° C. under a $N_2$ purge. 1.67 g of a TEA treated silica was added to the reactor, and this was agitated for 15 minutes. The temperature was reduced to 30° C., and 7 bar of $C_2H_4$ was admitted to the reactor. Then a mixture of 0.22 g of Catalyst A and 1.04 g of a TEA treated silica was injected into the reactor with high pressure $N_2$. The pressure of $C_2H_4$ was maintained at a pressure of 7 bar rapidly ramped at 80° C., and maintained at this temperature for the rest of the test. The total polymerisation time was 120 minutes. The reactor was vented and cooled, and 127 g of polymer was recovered, giving a catalyst activity of 41 g/g.h.bar.

Comparative Example 1

A similar protocol of Example 8 was followed, except that the initial 30 minute period at 30° C. was omitted. A mixture of 0.243 g of Catalyst A and 0.935 g of a TEA treated silica was injected at a temperature of 70° C., then the temperature immediately increased to 80° C. The run time was 100 minutes. 64 g of polymer was recovered, giving a catalyst activity of 20.5 g/g.h.bar.

Comparison between example 8 and comparative example 1 demonstrates that the in situ prepolymerisation in the agitated dry phase reactor results in a greater homopolymerisation catalyst activity.

Example 9

In-situ Prepolymerisation of Catalyst B 320 g of NaCl was added to a 2.5 liter volume agitated dry phase reactor, which had been previously baked out at 85° C. under a $N_2$ purge. 1.25 g of a TIBAL treated silica was added to the reactor, and this was agitated for 15 minutes. The temperature was reduced to 30° C., and 1 bar of $C_2H_4$ was admitted to the reactor. Then a mixture of 0.308 g of Catalyst B and 0.825 g of a TIBAL treated silica was injected into the reactor with high pressure $N_2$. The pressure of $C_2H_4$ was maintained at a pressure of 1 bar and 5 minutes, then the pressure increased rapidly to 6.5 bar and the temperature ramped rapidly to 70° C. Then $H_2$ and 1-hexene was admitted to the reactor. The temperature, $C_2H_4$ pressure and $H_2$ and 1-hexene levels were maintained constant during the rest of the test. The total polymerisation time was 191 minutes. During the test, the average $H_2/C_2H_4$ ratio was 0.0046 and the average 1-hexene/$C_2H_4$ ratio was 0.0052. The reactor was vented and cooled, and 278 g of polymer was recovered, giving a catalyst activity of 43.6 g/g.h.bar. The polymer $MI_{2\ 16}$ was 7.41 and the density 0.926 g/ml.

Example 10

In-situ Prepolymerisation of Catalyst B 288 g of NaCl was added to a 2.5 liter volume agitated dry phase reactor, which had been previously baked out at 85° C. under a $N_2$ purge. 1.30 g of a TIBAL treated silica was added to the reactor, and this was agitated for 15 minutes. The temperature was reduced to 30° C., and 1 bar of $C_2H_4$ was admitted to the reactor. Then a mixture of 0.238 g of Catalyst B and 0.725 g of a TIBAL treated silica was injected into the reactor with high pressure $N_2$. The pressure of $C_2H_4$ was maintained at a pressure of 1 bar for 5 minutes, then the pressure increased rapidly to 6.5 bar and the temperature ramped rapidly to 80° C. Then H$_2$ and 1-hexene were admitted to the reactor. The temperature, C$_2$H$_4$ pressure and H$_2$ and 1-hexene levels were maintained constant during the rest of the test. The total polymerisation time was 116 minutes. During the test, the average H$_2$/C$_2$H$_4$ ratio was 0.0052 and the average 1-hexene/C$_2$H$_4$ ratio was 0.0049. The reactor was vented and cooled, and 99 g of polymer was recovered, giving a catalyst activity of 33.1 g/g.h.bar. The polymer MI$_{2\ 16}$ was 2.7 and the density 0.9185 g/ml.

Example 11

In-situ Prepolymerisation of Catalyst B 305 g of NaCl was added to a 2.5 liter volume agitated dry phase reactor, which had been previously baked out at 85° C. under a N$_2$ purge. 1.20 g of a TIBAL treated silica was added to the reactor, and this was agitated for 15 minutes. The temperature was reduced to 30° C., and 1 bar of C$_2$H$_4$ was admitted to the reactor. Then a mixture of 0.231 g of Catalyst B and 0.912 g of a TIBAL treated silica was injected into the reactor with high pressure N$_2$. The pressure of C$_2$H$_4$ was maintained at a pressure of 1 bar for 5 minutes, then the pressure increased rapidly to 6.5 bar and the temperature ramped rapidly to 70° C. Then H$_2$ and 1-hexene were admitted to the reactor. The temperature C$_2$H$_4$ pressure and H$_2$ and 1-hexene levels were maintained constant during the rest of the test. The total polymerisation time was 189 minutes. During the test, the average H$_2$/C$_2$H$_4$ ratio was 0.00395 and the average 1-hexene/C$_2$H$_4$ ratio was 0.0048. The reactor was vented and cooled, and 168 g of polymer was recovered, giving a catalyst activity of 35.5 g/g.h.bar. The polymer MI$_{2\ 16}$ was 1.7 and the density 0.9295 g/ml.

Comparative Example 2

A similar protocol to Examples 9, 10 and 11 were followed, except that the initial low temperature and pressure start-up was omitted. Thus 344 g of NaCl was added to a 2.5 liter volume agitated dry phase reactor, which had been previously baked out at 85° C. under a N$_2$ purge. 1.30 g of a TIBAL treated silica was added to the reactor, and this was agitated for 15 minutes. The reactor was cooled to 70° C., and pressurized to 6.5 bar C$_2$H$_4$. Then H$_2$ and 1-hexene were admitted to the reactor. A mixture of 0.213 g of Catalyst C and 0.781 g of a TIBAL treated silica was injected into the reactor with high pressure N$_2$. The temperature, C$_2$H$_4$ pressure and H$_2$ and 1-hexene levels were maintained constant during the rest of the test. The total polymerisation time was 166 minutes. During the test, the average H$_2$/C$_2$H$_4$ ratio was 0.0038 and the average 1-hexene/C$_2$H$_4$ ratio was 0.0053. The reactor was vented and cooled, and 101 g of polymer was recovered, giving a catalyst activity of 26.3 g/g.h.bar.

Comparison between examples 9, 10 and 11 with comparative example 2 demonstrates that the in situ prepolymerisation in the agitated dry phase reactor results in a greater copolymerisation catalyst activity.

Example 12

Polymerisation with Prepolymer of Catalyst C 305 g of NaCl was added to a 2.5 liter volume agitated dry phase reactor, which had been previously baked out at 85° under a N$_2$ purge. 1.225 g of a TIBAL treated silica was added to the reactor, and this was agitated for 15 minutes. The reactor was cooled to 70° C. and pressurized to 6.5 bar C$_2$H$_4$. The H$_2$ and 1-hexene were admitted to the reactor. A mixture of 0.956 g of prepolymer of catalyst C and 0.745 g of a TIBAL treated silica was injected into the reactor with high pressure N$_2$. The temperature, C$_2$H$_4$ pressure and H$_2$ and 1-hexene were maintained constant during the rest of the test. The total polymerisation time was 127 minutes. During the test, the average H$_2$/C$_2$H$_4$ ratio was 0.00415 and the average 1-hexene/C$_2$H$_4$ ratio was 0.0057. The reactor was vented and cooled and 250 g of polymer was recovered, giving an activity of 28.8 g/g.h.bar based on the mass of the original catalyst.

Example 13

Polymerisation with Prepolymer of Catalyst E 292 g of NaCl was added to a 2.5 liter volume agitated dry phase reactor, which had been previously baked out at 85° C. under a N$_2$ purge. 1.223 g of a TIBAL treated silica was added to the reactor, and this was agitated for 15 minutes. The reactor was cooled to 70° C., and pressurized to 6.5 bar C$_2$H$_4$. Then H$_2$ and 1-hexene were admitted to the reactor. A mixture of 1.02 g of prepolymer of catalyst E and 0.744 g of a TIBAL treated silica was injected into the reactor with high pressure N$_2$. The temperature, C$_2$H$_4$ pressure and H$_2$ and 1-hexene levels were maintained constant during the rest of the test. The total polymerisation time was 127 minutes. During the test, the average H$_2$/C$_2$H$_4$ ratio was 0.0044 and the average 1-hexene C$_2$H$_4$ ratio was 0.0048. The reactor was vented and cooled, and 175 g of polymer was recovered, giving an activity of 37.4 g/g.h.bar based on the mass of the original catalyst.

Example 14

Polymerisation with Prepolymer of Catalyst E 352 g of NaCl was added to a 2.5 liter volume agitated dry phase reactor, which had been previously baked out at 85° C. under a N$_2$ purge. 1.20 g of a TIBAL treated silica was added to the reactor, and this was agitated for 15 minutes. The reactor was cooled to 60° C., and pressurized to 6.5 bar C$_2$H$_4$. Then H$_2$ and 1-hexene were admitted to the reactor. A mixture of 0.915 g of prepolymer of catalyst E and 0.8 g of a TIBAL treated silica was injected into the reactor with high pressure N$_2$. The temperature was taken rapidly to 70° C. The temperature, C$_2$H$_4$ pressure and H$_2$ and 1-hexene levels were maintained constant during the rest of the test. The total polymerisation time was 87 minutes. During the test, the average H$_2$/C$_2$H$_4$ ratio was 0.0044 and the average 1-hexene/C$_2$H$_4$ ratio was 0.0055. The reactor was vented and cooled, and 128 g of polymer was recovered, giving an activity of 44.5 g/g.h.bar based on the mass of the original catalyst.

Examples 13 and 14 and comparative example 2 start from the same basic catalyst formulation (see above). They demonstrate that the effect of prepolymerising the catalyst prior to injection into the reactor results in improved catalyst activity.

We claim:
1. A process for polymerising ethylene or copolymerising ethylene and one or more alpha-olefins in the gas phase comprising:
(1) in a first stage prepolymerising ethylene or ethylene and one or more alpha-olefins in a gas phase at a temperature in the range 20 to 70° C. in the presence of a catalyst system comprising (a) a supported constrained geometry complex and (b) an activator to form a prepolymerised catalyst, and

(2) in a second stage polymerising ethylene or ethylene and one or more alpha-olefins in the gas phase at a temperature in the range 65 to 100° C. in the presence of said prepolymerised catalyst;

wherein said first and second stages are carried out in a single gas phase reactor.

2. A process according to claim 1 wherein the first stage is carried out at a temperature in the range 25–40° C. and the second stage at a temperature in the range 70–85° C.

3. A process according to claim 1 wherein the first stage is carried out at a pressure in the range 0.1 to 10 bar.

4. A process according to claim 1 wherein the first and second stages are performed in the dry phase.

5. A process according to claim 4 wherein the first and second stages are performed using an agitated dry phase reactor.

6. A process according to claim 1 wherein the constrained geometry complex has the formula:

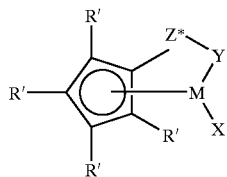

wherein
R' each occurrence is independently selected from hydrogen, hydrocarbyl, silyl, germyl, halo, cyano, and combinations thereof, said R' having up to 20 non hydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$-bonded diene group having up to 30 non-hydrogen atoms, which forms a $\pi$-complex with M;

Y is —O—, —S—, —NR*—, —PR*—;

M is titanium or zirconium in the +2 formal oxidation state; and

Z* is SiR*$_2$, CR*$_2$, SiR*$_2$SiR*$_2$, CR*$_2$CR*$_2$, CR*=CR*, CR*$_2$SiR*$_2$, or GeR*$_2$; wherein:

R* each occurrence is independently hydrogen, or a member selected from hydrocarbyl, silyl, halogenated alkyl, halogenated aryl, and combinations thereof, and R* having up to 10 non-hydrogen atoms, and optionally, two R* group from Z* (when R* is not hydrogen), or an R* group from Z* and an R* group from Y form a ring system.

7. A process according to claim 6 wherein the complex is:
(tert-butylamido) (tetramethyl-η5-cyclopentadienyl) dimethyl silane titanium (II) 1,3-pentadiene.

8. A process according to claim 1 wherein the complex is supported on silica.

9. A process according to claim 8 wherein the silica is pretreated with a tri alkylaluminium compound.

10. A process according to claim 1 wherein the activator is tris(penta flurophenyl) boron.

11. A process according to claim 1 wherein the ratio of complex to activator is in the range 1:10,000 to 100:1.

12. A process according to claim 11 wherein the ratio is in the range 1:10 to 1:1.

13. A process according to claim 1 wherein the apha-olefins are 1-butene, 1-hexene or 4-methyl-1-pentene.

14. A process according to claim 1 wherein the constrained geometry complex has the formula:

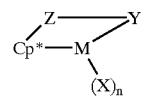

wherein:

Cp* is a single $\eta^{5-}$ cyclopentadienyl or $\eta^5$-substituted cyclopentadienyl group optionally covalently bonded to M through —Z—Y— and corresponding to the formula:

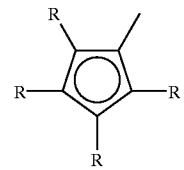

wherein R each occurrence is hydrogen or a moiety selected from halogen, alkyl, aryl, haloalkyl, alkoxy, aryloxy, silyl groups, and combinations thereof of up to 20 non-hydrogen atoms, or two or more R groups together form a fused ring system;

M is zirconium, titanium or hafnium bound in an $\eta^5$ bonding mode to the cyclopentadienyl or substituted cyclopentadienyl group and is in a valency state of +3 or +4;

X each occurrence is hydride or a moiety selected from halo, alkyl, aryl, silyl, germyl, aryloxy, alkoxy, amide, siloxy, and combinations thereof having up to 20 non-hydrogen atoms;

n is 1 or 2 depending on the valence of M;

Z is a divalent moiety comprising oxygen, boron, or a member of Group 14 of the Periodic Table of the Elements;

Y is a linking group covalently bonded to the metal comprising nitrogen, phosphorus, oxygen or sulfur, or optionally Z and Y together form a fused ring system.

15. A process according to claim 14 wherein the complex is (tert-butylamido) (tetramethyl-η5-cyclopentadienyl) dimethylsilanetitanium dimethyl.

* * * * *

UNITED STATES PATENT AND TRADEMARK OFFICE
CERTIFICATE OF CORRECTION

PATENT NO. : 6,437,060 B1
DATED : August 20, 2002
INVENTOR(S) : Peter James Maddox et al.

It is certified that error appears in the above-identified patent and that said Letters Patent is hereby corrected as shown below:

Column 13,
Line 27, after "wherein" insert a comma.
Line 53, "tetrarnethyl" should read -- tetramethyl --.

Column 14,
Line 7, "apha-" should read -- alpha- --.

Signed and Sealed this

Eighteenth Day of February, 2003

JAMES E. ROGAN
*Director of the United States Patent and Trademark Office*